United States Patent [19]

Wiand

[11] Patent Number: 5,607,488
[45] Date of Patent: Mar. 4, 1997

[54] MOLDED ABRASIVE ARTICLE AND PROCESS

[76] Inventor: Ronald C. Wiand, 1494 Heatherwood Dr., Troy, Mich. 48098

[21] Appl. No.: 475,875

[22] Filed: Jun. 7, 1995

Related U.S. Application Data

[63] Continuation-in-part of Ser. No. 821,953, Jan. 16, 1992, Pat. No. 5,449,388, which is a continuation-in-part of Ser. No. 732,503, Jul. 18, 1991, Pat. No. 5,209,760, which is a continuation-in-part of Ser. No. 526,055, May 21, 1990, abandoned.

[51] Int. Cl.$^6$ .................................................. B24B 1/00
[52] U.S. Cl. ........................... 51/295; 51/298; 51/307; 51/309
[58] Field of Search ....................... 51/293, 295, 298, 51/307, 308

[56] References Cited

U.S. PATENT DOCUMENTS

| | | | |
|---|---|---|---|
| 51,576 | 2/1866 | Osborn | 428/331 |
| 945,687 | 8/1871 | Scheider | 51/298 |
| 1,507,836 | 9/1924 | King | 51/398 |
| 2,406,385 | 8/1946 | Kistler | 523/149 |
| 2,907,146 | 10/1959 | Dyar | 51/195 |
| 3,048,482 | 8/1962 | Hurst | 51/298 |
| 3,098,329 | 7/1963 | Doran | 51/177 |
| 3,297,599 | 1/1967 | Eschen | 523/159 |
| 3,307,969 | 3/1967 | Quinn | 523/159 |
| 3,455,866 | 7/1969 | D'Alessandro | 523/159 |
| 3,468,079 | 9/1969 | Kaufman | 51/378 |
| 3,959,194 | 5/1976 | Adelmann | 51/298 |
| 4,078,340 | 3/1978 | Klecker | 51/295 |
| 4,088,729 | 5/1978 | Sherman | 264/259 |
| 4,106,915 | 8/1978 | Kagawa | 51/298 |
| 4,111,666 | 9/1978 | Kalbow | 51/295 |
| 4,160,761 | 7/1979 | Prusinski | 524/442 |
| 4,554,765 | 11/1985 | Grimes | 51/401 |
| 4,617,767 | 10/1986 | All | 51/358 |
| 4,653,236 | 3/1987 | Grimes | 51/401 |
| 4,675,975 | 6/1987 | Kucharczyk | 29/566 |
| 4,750,915 | 6/1988 | Tomita | 51/298 |
| 4,754,580 | 7/1988 | Mattson | 51/177 |
| 4,918,116 | 4/1990 | Gardziella | 523/149 |
| 5,209,760 | 5/1993 | Wiand | 51/298 |
| 5,250,085 | 10/1993 | Mevissen | 51/295 |
| 5,281,244 | 1/1994 | Wiand | 51/295 |
| 5,449,388 | 9/1995 | Wiand | 51/298 |

FOREIGN PATENT DOCUMENTS

| | | |
|---|---|---|
| 619539 | 5/1961 | Canada . |
| 345239A | 12/1989 | European Pat. Off. . |
| 2929479 | 2/1981 | Germany . |
| 3342480 | 6/1985 | Germany . |
| 52-74990 | 6/1977 | Japan . |
| 52-32480 | 8/1977 | Japan . |
| 106166 | 5/1917 | Netherlands . |
| 1827 | of 1862 | United Kingdom . |
| 1243288 | 8/1971 | United Kingdom . |
| 2043501 | 10/1980 | United Kingdom . |

*Primary Examiner*—Deborah Jones
*Attorney, Agent, or Firm*—Harness, Dickey & Pierce, P.L.C.

[57] ABSTRACT

An abrasive article produced by a molding process including injection molding blow molding, extrusion, and thermoforming where the article includes a thermoformable material having an abrasive grit intermixed homogeneously therein.

13 Claims, 4 Drawing Sheets

MOLDED ABRASIVE ARTICLE AND PROCESS

RELATED APPLICATIONS

This application is a continuation-in-part of U.S. application Ser. No. 07/821,953, filed Jan. 16, 1992, now U.S. Pat. No. 5,449,388 entitled "Injection Molded Abrasive Article and Process" which is a continuation-in-part of U.S. application Ser. No. 732,503, filed Jul. 18, 1991, now U.S. Pat. No. 5,209,760, entitled "Injection Molded Abrasive Pad" which is a continuation-in-part of U.S. application Ser. No. 526,055, filed May 21, 1990, now abandoned entitled "Flexible One-Piece Diamond Sheet Material With Spaced Apart Abrasive Portions".

BACKGROUND OF THE INVENTION

The present invention relates to thermoformed abrasive articles and processes therefor. Still more particularly the present invention relates to an abrasive pad or other abrasive articles such as a lapping tool, abrasive wheels and the like which are injection molded, blow molded, extruded, or thermoformed.

In the past, the use of abrasive pads, which include abrasive resinoid segments attached to backing substrates, has been common when polishing stones and marbles and other materials. Because of the relatively thick and non-yielding resinoid segments generally used in these pads, it has been problematic to provide a flexible type abrasive pad using these types of segments. In the past, these segments have been attached to backing substrates, such as fabrics or the like, utilizing a large number of small segments to produce a flexible abrasive pad. Such abrasive pads are commonly used on rotary polishers for finishing of marble floor surfaces, for instance. While these structures have been useful as rotary polishing pads, the operational life of the pads has been low. This is because of disattachment of segments during use.

Therefore, it has been a goal in the art to produce a long lasting flexible "segmented-type" abrasive sheet material which will have increased durability and be less subject to loss of abrasive portions during use. This goal has lead to the discovery that thermoplastics can be used in abrasive pads as is set forth in my prior patent application, U.S. Ser. No. 526,055, filed May 21, 1990, for "Flexible One-Piece Diamond Sheet Material With Spaced Apart Abrasive Portions" and U.S. Ser. No. 732,503, filed Jul. 18, 1991, entitled "Injection Molded Abrasive Pad".

It has now been discovered that a broad range of abrasive articles can be molded by different molding processes including injection molding, blow molding, extrusion and thermoforming in an economical and efficient process. In the past, thermosets or thermoset-like materials have primarily been utilized for abrasive articles because of their ability to withstand the high temperatures associated with abrasive operations. For purposes herein thermoset refers to polymer materials which chemically cross-link and are not re-workable at substantially the same temperature.

However, the manufacture of abrasive articles with thermoset or thermoset-like materials is costly because of the relatively slow batch type manufacturing processes and the costs of materials involved. The use of a molding process with thermosets or thermoplastics has been thought to be impractical because of the anticipated wear on the injection molding apparatus. Additionally, some of the extremely high melting point thermoset-like compositions are costly and impractical for production of abrasive articles.

Therefore, it is a goal in the present invention to provide an abrasive pad which can be efficiently manufactured.

SUMMARY OF THE INVENTION

In accordance with the present invention an abrasive article is produced by injection molding. In accordance with one aspect of the present invention there is provided a one-piece flexible abrasive sheet which may be in the form of a pad. The one-piece abrasive sheet includes a flexible planar sheet portion may have a plurality of abrasive protrusions extending therefrom. The protrusions are intimately molded with a backing sheet from a thermoplastic material. The material includes an intimate mixture of an abrasive grit material and a thermoplastic.

Injection molding offers one molding process by which an abrasive article can be produced. According to other aspects of the present invention, a flexible abrasive sheet can be produced by forming a mixture of a thermoset or thermoset-like material and an abrasive material. The mixture is then molded into a flexible sheet by an applicable molding process including blow molding, extrusion and thermoforming. The flexible abrasive sheets formed by the molding process can then be cut by an appropriate cutter into desirable lengths, sections or shapes.

The abrasive pad of the present invention provides a one-piece pad which increases the longevity of the pad during normal use, such as finishing of marble floors or flat edges and radius edges of counter tops, and reduces the amount of lost abrasive portions due to the integral molding of the portions with the substrate sheet.

The manufacture of abrasive articles that include thermoset or thermoset-like materials can be extended to other molding processes beyond that of injection molding. For example, other types of molding processes include blow molding, extrusion, and thermoforming.

In accordance with the methods and products of the present invention a variety of abrasive structures can be produced via molding techniques. Additional benefits and advantages of the present invention will become apparent from the subsequent description of the preferred embodiments and the appended claims taken in conjunction with the accompanying drawings.

DESCRIPTION OF THE PREFERRED EMBODIMENTS

In its broadest aspects, the present invention discloses a method and product for forming an abrasive article utilizing thermoforming techniques such as injection molding, blow molding, extrusion and thermoforming. Referring now to the drawings, according to the present invention there is provided a flexible one-piece abrasive sheet, such as pad 10. The one-piece abrasive pad 10 includes a flexible planar sheet portion 12 which has a plurality of abrasive protrusions 14 extending therefrom. The protrusions 14 are intimately molded with the sheet portion 12. In a first preferred embodiment injection molding of a thermoplastic material which has an intimate mixture of an abrasive grit material therein is used. In a second embodiment a thermosetting material which includes an abrasive grit material intermixed therein may be used to mold abrasive articles.

Figure 1:
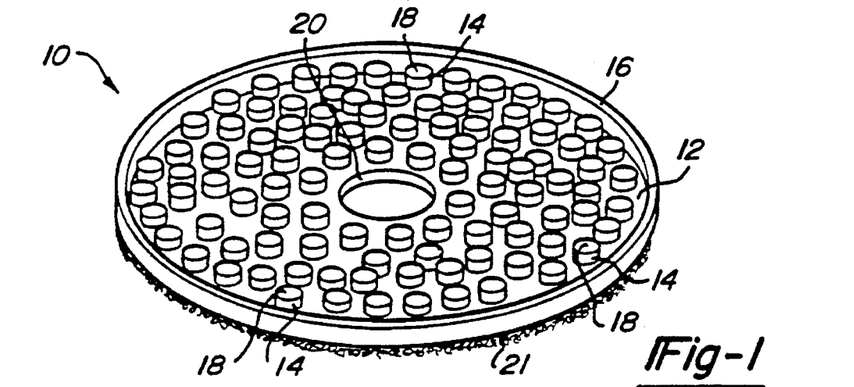
FIG. 1 is a perspective view of an abrasive pad made in accordance with the teachings of the present invention.

In a one embodiment of the present invention, the pad 10 is formed in a circular configuration with a peripheral lip portion 16 extending in the same direction as the protrusions 14. The lip portion 16 advantageously allows the pad to climb over obstacles in an irregular surface without damaging the abrasive protrusions 14. The advantage of the lip portion 16 is set forth in more detail in my co-pending U.S. patent application Ser. No. 502,056 Entitled "Marble, Granite and Stone Finishing Method and Abrasive Pads Therefor", filed Mar. 30, 1990, which is incorporated herein by reference thereto. The protrusions 14 have outer abrasive end surfaces 18 which are co-planar to one another. Preferably lip 16 is also co-planar to these peripheral edges 18. The pad 10 includes a central orifice 20 which is provided for fitting on a particular rotary tool to provide clearance during use. A means for attachment to a polishing tool, such as a velcro hook and loop fastener 21 is attached to the back of the pad 10. Such velcro attachments are common in the rotary tools used today. However, other means for attachment could readily be adapted as a particular tool required.

Figure 4:
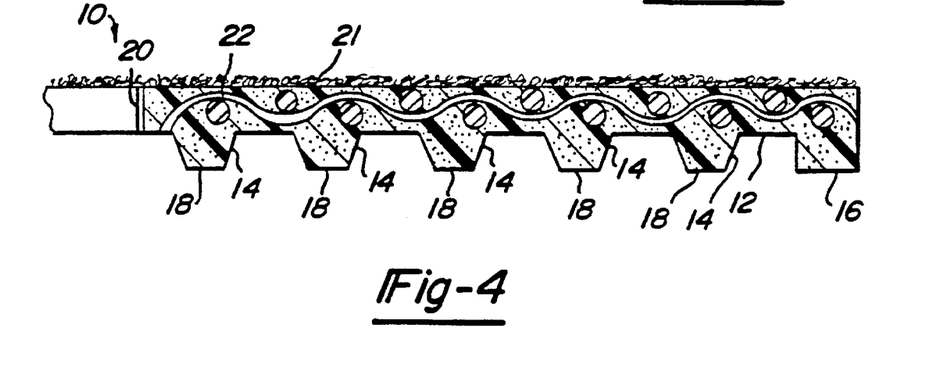
FIG. 4 is a sectional view of the abrasive pad of FIG. 1.

Referring now to FIG. 4, in a preferred embodiment a strengthening element 22 is integral with the sheet portion 12. The strengthening element 22 may be any of a number of materials which have a plurality of apertures therethrough. A suitable strengthening element provides strengthening to the pad 10 while retaining flexible characteristics of the sheet portion 12 during use. In a preferred embodiment the strengthening element 22 is a woven mesh material such as a fiberglass mesh material, as shown in FIG. 4. In the embodiment shown in FIG. 4, the mesh material is embedded in the thermoplastic during the forming of the sheet portion 12.

Figure 3:
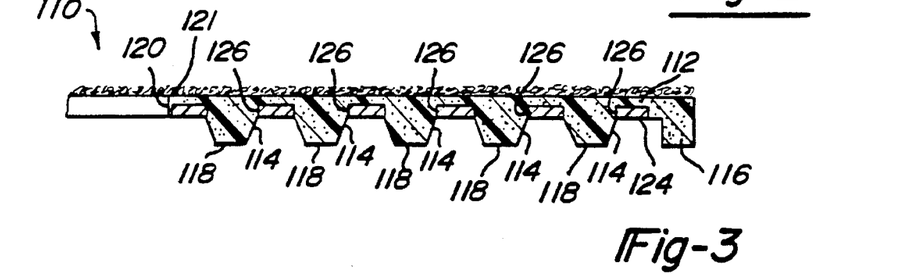
FIG. 3 is a sectional view of an alternate embodiment of an abrasive pad made in accordance with the teachings of the present invention.

Referring now to FIG. 3, there is shown an alternate embodiment of an abrasive pad, generally shown at 110. In the figures like numerals differing by 100 refer to like elements in the alternate embodiment. The abrasive pad 110 is similar to the pad 10, however a perforated phenolic sheet material 124 is utilized as a strengthening element in place of the strengthening mesh 22. In this embodiment the thermoplastic is molded in-situ with the phenolic board such that the thermoplastic progresses through the perforations in the phenolic board material. The phenolic sheet material 124 is attached to the thermoplastic due to the compatible adhesive characteristics of the thermoplastic and the phenolic board and also due to the mechanical interlock of the protrusion 114 with the apertures 126 in the phenolic sheet material 124. A NEMA grade G-3 phenolic board, such as that utilized in circuit board applications, is a preferred material for this embodiment.

It is critical in a thermoplastic article of the present invention that thermoplastic materials useful in the present invention are true thermoplastics which may be formed and re-formed at substantially the same temperature. It is critical in the thermoplastic embodiments of the present invention that the working temperature of the thermoplastic be greater than about 100° C. but less than about 400° C. If the working temperature drops below the 100° C. temperature the heat created during use of the pads will tend to cause plasticity in the materials and cause failures.

In a first preferred embodiment the material used for forming the abrasive articles of the present invention is a true-thermoplastic polymer material which includes suitable abrasive particles interspersed homogeneously therethrough. The material used must be sufficiently formable, by melting, such that it may be forced to flow into and around the strengthening element if desired. Suitable thermoplastic materials include polycarbonates, polypropylenes, polyethylenes, nylons, polyurethanes, or other thermoplastics which can be thermomelted with heat and pressure to produce the abrasive pad 10 or 110. A preferred material is a polypropylene powdered material which may be mixed with diamond grit particles and/or silicon carbide type particles in its powdered form prior to the molding operation. Of course, other abrasive grit materials could be utilized in the present invention as will be readily appreciated by those skilled in the art.

In the past, it has generally been thought that thermoplastics are not generally useful in abrasive grit particles due to the heat produced during use of abrasive pads, and the resulting decomposition and melting of such materials. However, in the present invention I have deviated from the prior art teachings by using thermoplastic materials which I have found to be suitable for such applications. Thermoplastics are desirable from a production standpoint in that thermoplastics are adaptable to cost effective manufacturing techniques such as injection molding. In one embodiment of the present invention abrasive pads are injection molded in accordance with a process to be set forth below.

Figure 2:
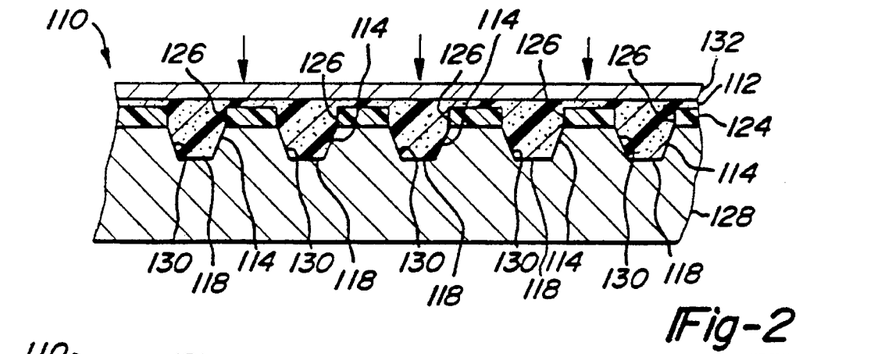
FIG. 2 is a sectional view illustrative of a process, in accordance with the teachings of the present invention, for manufacture of an abrasive pad.

Referring now to FIG. 2, in accordance with the compression molding method aspects of the present invention a lower mold platen 128 is provided which has a series of spaced indentation portions 130 corresponding to the shape of the desired protrusion in the resulting abrasive pad or sheet, such as pad 110. An upper platen 132 is provided for placing a mixture of a thermoplastic material and an abrasive grit material under pressure, in the presence of heat, for forcing the thermoplastic and abrasive grit mixture into the indentations 130 of the mold platen 128. This forms the one-piece abrasive pad of the present invention.

Thus, in accordance with the steps of the present invention, it is first necessary to provide an intimate mixture of abrasive grit materials and a polymer material. This could be accomplished by mixing a powdered thermoplastic with an abrasive grit, by melt mixing these constituents.

Thereafter, this mixture is placed in the mold platen 128 and the mixture is heated under pressure to form the pad 110 in the mold portion of the platen 128.

In a preferred embodiment, a strengthening element, such as the phenolic board material 124, is placed in the platen such that the orifices 126 are in the same locations as the indentations 130 of the platen 128. Thereafter, a mixture of a thermoplastic and abrasive material is placed on top of this. The platen 132 is then lowered on the above constituents in the presence of heat which thermoplastically deforms the plastic material with the abrasive grit intermixed therein and forces it through the orifices 126 and into the indentations 130 of the lower platen 128.

In an alternate embodiment, such as that shown in FIG. 4, the fiberglass or other mesh material, which is utilized as a strengthening element, may be placed on the platen 128 and thereafter the thermoplastic material is pressed through the apertures and the strengthening element to form the final abrasive pad or structure, as shown in FIG. 4.

Figure 5:
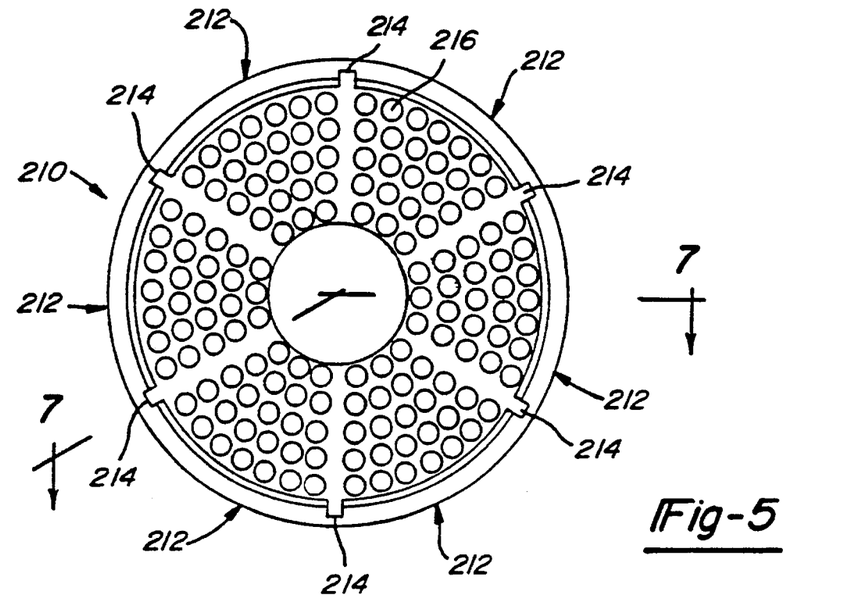
FIG. 5 is a front plan view of an alternate embodiment of an abrasive pad which is injection molded.
Figure 6:
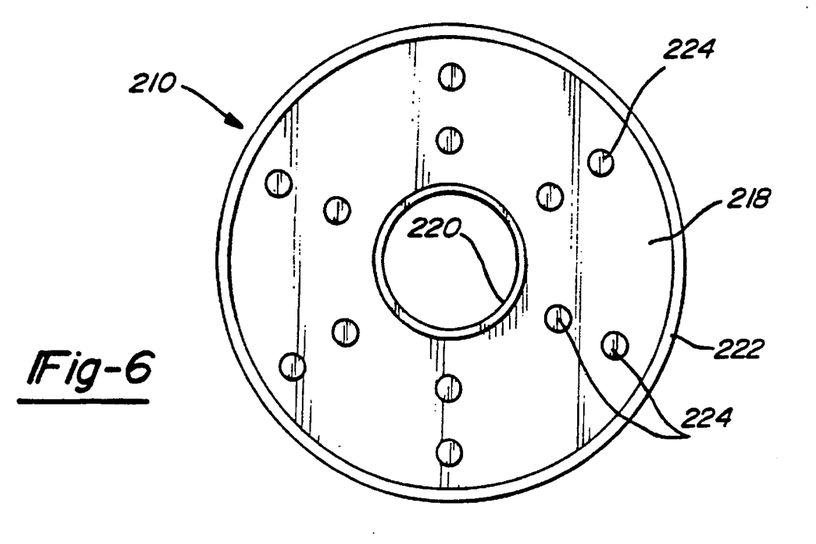
FIG. 6 is a rear plan view of the abrasive pad of FIG. 5.
Figure 7:
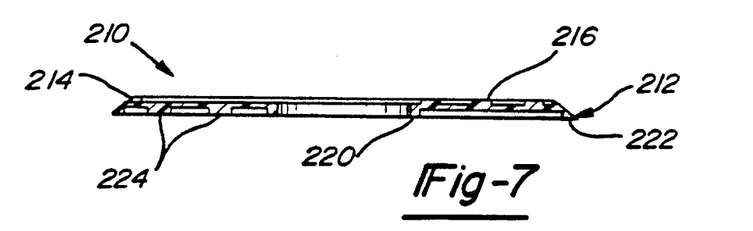
FIG. 7 is a sectional view of the abrasive pad of FIG. 5 taken along line 7—7.
Figure 8:
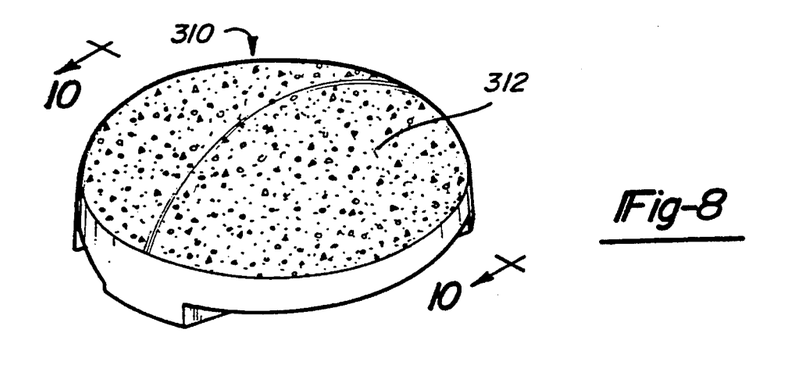
FIG. 8 is a top perspective view of an abrasive article in the form of a lapping tool made in accordance with the teachings of the present invention.
Figure 9:
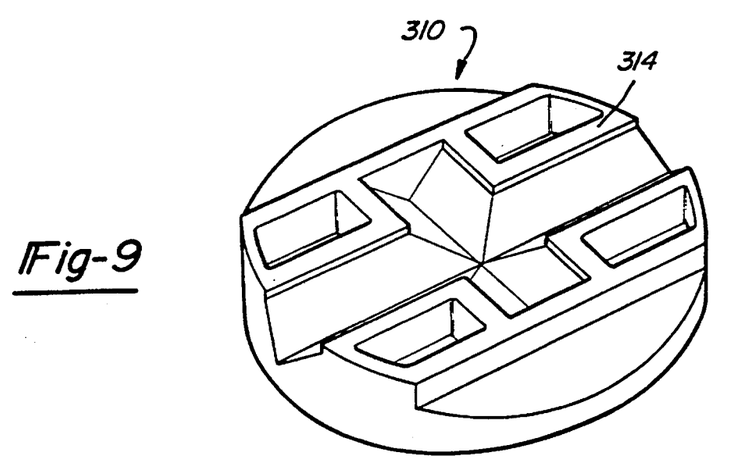
FIG. 9 is a bottom perspective view of the abrasive article of FIG. 8.

Referring now to FIGS. 5–7, there is shown an alternate embodiment of a pad made in accordance with the teachings of the present invention wherein injection molding is used to produce the pad 210. The pad 210 includes a series of pie slice shaped areas, generally indicated at 212, around the circumference of the pad 210. These areas are separated by radial slotted portions, generally indicated at 214. The pie shaped areas 212 include a series of flattened stub protrusions 216 interspersed amongst these pie shaped areas 212. These protrusions are formed by the mold surfaces of an injection type mold cavity configuration. The rear side of the pad 210 includes a hollowed out circumferential portion 218 which has an inner lip 220 and an outer lip 222 which extend axially for supporting the pad on the tool support structure. The protrusions 224 are spaced throughout the backside and are at a co-planar level with the axial extending lips 220 and 222 for providing support throughout the pad area.

In an alternate embodiment of an abrasive pad of the present invention, in order to save grit material the backing substrate may be first injection molded with an abrasive free polypropylene and thereafter the abrading protrusions 216 may be injection molded onto the backing substrate as a separate function. In such an embodiment, the protrusions will contain the grit matrix material but will be melt bonded to the backing substrate which contains no grit material. Since the materials are identical or at least melt bondable to one another the resulting pad is a strong one-piece structure. Thus, in accordance with this aspect, grit material is placed only in the areas required by the abrasive protrusions and is not wasted as becoming part of the backing substrate or the like.

In accordance with the broad aspects of the process of the present invention, a thermoformable polymer such as a thermoset or thermoplastic and abrasive grit material are provided in an intimate mixture suitable for injection molding. Thereafter an injection molding apparatus is provided for thermoforming the abrasive grit and polymer mixture. The abrasive article is then formed by thermoforming the mixture with the injection molding apparatus to form the abrasive article. The article is then allowed to cool to set the abrasive article. The thermoplastic material utilized is preferably a true thermoplastic such as that set forth above, however, in an alternate embodiment a thermoset may be utilized. Apparatus utilized can be conventional extruders, blow molding equipment or the like. In a particularly preferred embodiment an injection molding process is used as follows.

In accordance with the injection molding process of the present invention, an abrasive article may be made with or without a strengthening element sheet inserted therein by the following steps. First a suitable injection mold structure or cavity is prepared and provided in which the article shape is set forth in an injection mold machine. Thereafter, a thermoplastic material, preferably a polypropylene or the like, is mixed with abrasive grit material, for instance from about 2 micron to about 300 micron sized diamond grit particulate matter and suitable secondary fillers such as silicon carbide, aluminum oxide, copper powder, aluminum powder, silica fiberglass or the like if desired. Thereafter, the mixture is molded at a temperature above the softening point of the thermoplastic material and injected into the mold to produce the thermoplastic one-piece pad. In a preferred embodiment, the thermoplastic preferably has a melting temperature above about 100° C. and would be molded at a temperature of 900° F. (about 400° C.) using 1,000 psi with 50 pounds of back pressure. It is believed that the clamped cycle time would be an effective time such as about 12 seconds.

While diamond grit material is preferred as the primary abrasive grit other diamond hardness abrasive grits can be substituted as will be readily appreciated to those skilled in the art. If a strengthening element is desired such an element could be placed into the mold prior to the injection molding process. This allows for molding of the strengthening element into the pad itself. Similarly, an abrasive structure could be formed on a substrate by injection molding of the abrasive structure onto the substrate.

Thermoplastics for .use in injection molding or pressure forming which provide proper structure in the final abrasive structure have the following characteristics. Preferably, the thermoplastics will have a softening point of greater than 100° C. and preferably less than 250° C. and densities of between 3.0 and 4.92 $g/cm^2$ and preferably between 3.0 to 4.0. Suitable thermoplastic materials include polypropylenes, polyethylenes, low density polyethylenes, high density polyethylenes, nylons and polycarbonates with melt ranges varying from about 100° C. to about 250° C. Such abrasive structures must be able to withstand heat generated during grinding without deteriorating, thus suitable materials have melting ranges of from about 100° C. to about 250° C. Suitable low density polyethylenes include Hifax™ types manufactured by Himont. Suitable polypropylenes are those such as Profax™ obtained from Himont. A suitable high density polyethylene is a Paxon™ brand obtained from Allied Corp. Nylon 66 and Nylon 12 are suitable and Lexan™ polycarbonate obtained from G.E. Plastics is also suitable.

In order to enhance the life of the thermoplastic abrading articles of the present invention it is preferable that in addition to diamond grit material, secondary abrasive grit fillers be utilized in the thermoplastic articles of the present invention. Such secondary fillers provide abrasive to the work surface in areas where diamond grit is absent thereby enhancing abrasion resistance of the tool and protecting the diamond grit from premature dislodgement. In a preferred embodiment, such secondary fillers may include abrasives such as silicon carbide, aluminum oxide and corundums as examples or may be selected from fillers such as powder metals, powder organic material, powdered inorganic materials and mixtures thereof. Preferably, thermoplastic abrasive compositions include from about 5% to about 80% by volume secondary fillers; from about 1% to about 20% by volume diamond grit and from about 5% to about 90% by volume thermoplastic material, which thermoplastic is preferably in the range of from about 20% to about 60%.

Thus, utilizing these teachings, various abrasive structures can be produced. For instance, a grinding wheel type abrasive structure can be produced by first selecting a core structure which is compatible for injection molding of an abrasive mixed with a thermoplastic as set forth above. Many other shapes or forms can be produced via the injection molding of the abrasive grit intermixed with the thermoplastic. For instance, diamond wheels, hand sanding pads, rotary edge polishing pads, lapping tools, or the like are possible as articles of manufacture of the present invention.

Referring now to FIGS. 8 through 11, there is shown a cylinder type lapping tool 310 produced in accordance with the teachings of the present invention. Lapping tool 310 is a one-piece tool injection molded in accordance with the teachings of the present invention. Lapping tool 310 includes a front face 312 and a back surface 314. The front face 312 has a lapping tool curvature for finish grinding of a lens. The back surface includes structure for attachment to a lapping machine.

Figures 10, 11:
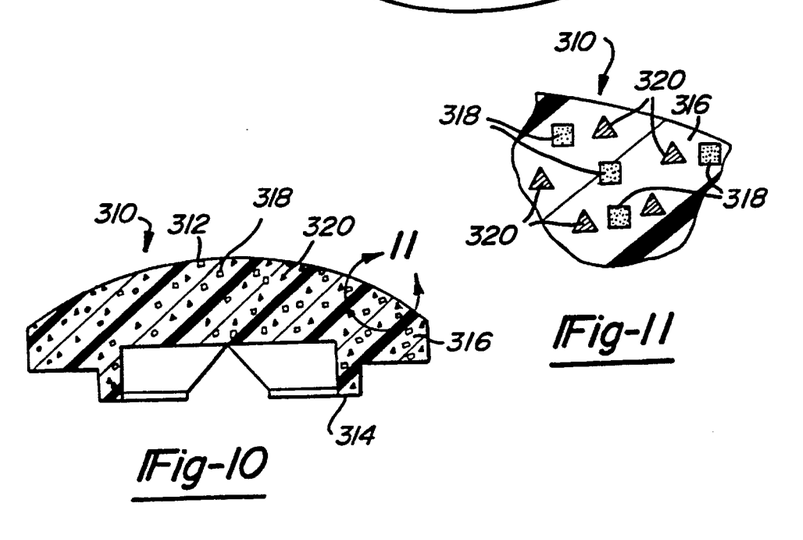
FIG. 10 is a sectional view of the abrasive article of FIG. 8 taken along line 8—8.
FIG. 11 is a detailed section taken from area 11 in FIG. 10.

Referring to FIGS. 10 and 11, the lapping tool 310 is made of a thermoplastic 316 with diamond grit particles 318 and secondary filler particles 320 interspersed therethrough.

Lapping tools made in accordance with the teachings of the present invention have demonstrated improved finishing of lenses in that they can rough grind and finish grind lenses using the same tool. Using conventional procedures such operations require two separate steps. Thus, the lapping tools of the present invention provide an unexpected benefit over conventional tools.

Abrasive articles can also be produced in accordance with the present invention by injection molding of thermoset plastics which are intermixed with an abrasive grit material for thermoset type injection molding. Thermoset articles would be useful with abrasive grit and filler content set forth above. Of course, as will be readily appreciated by those skilled in the art, thermoset injection molding techniques and equipment must be utilized when producing such abrasive articles.

Injection molded pads have greater homogeneity in grit distribution due to the inherent mixing involved during the process and quick setting times. Thus, abrasive articles produced in accordance with the injection molding teachings have superior abrasive qualities over those produced by other processes.

The discussion of developing the pads and various abrasive articles 10, 110, 210 and 310 above was directed to injection molding processes. However, fabrication of these abrasive articles can be extended to other types of polymer molding processes including, but not limited to, blow molding, extrusion and thermoforming, because the thermoplastic carrier of the different abrasive grits can be molded in many different ways. For the discussion below, an intimate mixture of a polymer such as a thermoplastic or thermoset material including an interdispersed grit material will be discussed in connection with different types of molding processes. However, it will be appreciated by one skilled in the art that the discussion above concerning the particular constituents and ingredients of the mixture generated for injection molding can be extended to the different molding processes discussed below. Likewise, the various secondary fillers and support structures can also be extended to the processes below.

Figures 12, 13A, 13B, 14:
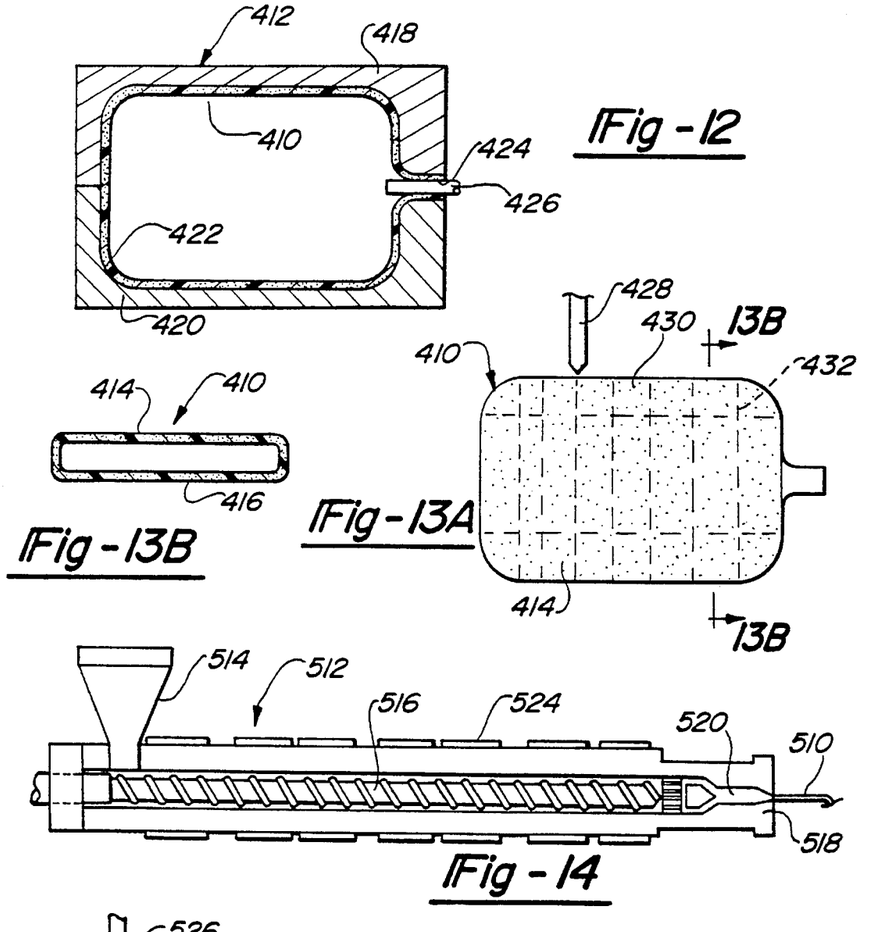
FIG. 12 is a sectional view of a blow mold including a blow molded abrasive article.
FIG. 13A is a side plan view of the blow molded abrasive article shown in FIG. 12 positioned relative to a cutter to cut the article into desirable strips.
FIG. 13B is a length-wise sectional view of the abrasive article of FIG. 13A.
FIG. 14 is a side plan view of an extrusion device extruding a flexible abrasive sheet.

FIGS. 12, 13A and 13B show a molded article 410 that has been blow molded by a blow molding device 412. In one embodiment, the abrasive article 410 is blow molded into a relatively flat article having sides 414 and 416 that are large abrasive sheets as specifically depicted in the sectional view of FIG. 13B. The blow molding device 412 includes an upper mold platen 418 and a lower mold platen 420 that are heated and positioned together to form a desirably shaped mold cavity 422. The mold cavity 422 includes an inlet 424 that accepts a blow molding nozzle 426. The blow molding nozzle 426 injects a heated mixture (not shown) of a thermoplastic, thermoset or thermoset-like resin of the types discussed above, secondary fillers and an abrasive grit into the cavity 422, and then injects air through the nozzle 426 to blow the mixture into the shape of the cavity 422, as shown. The mold platens 418 and 420 are then cooled so that the article 410 sets into the shape of the cavity 422. The upper and lower mold platens 418 and 420 are then separated to remove the article 410. Blow molding of thermoplastic articles is a process that is well understood in the art, and therefore a more detailed discussion of this process is not necessary.

The abrasive article 410 can then be cut into any of a number of desirable shapes. A cutter 428 is positioned relative to the article 410 so as to cut the article 410 into any desirable shape depending on the specific application. For example, the abrasive article 410 may be sliced by the cutter 428 into a series of rectangular lengths to form abrasive strips 430 applicable to be shaped into, for example, a belt sanding abrasive article. A series of lines 432 are shown relative to the article 410 in FIG. 13A. By using the cutter 428 to cut along each of the lines 432, the ends and sides of the blow molded abrasive article 410 can be removed to separate the sheets 414 and 416, and the article 410 can then be cut into a series of the strips 430. Of course, other shaped cutters and dies can be incorporated to cut other shapes from the article 410 depending on the particular application.

As mentioned above, extrusion is also a thermoplastic forming process that is applicable to form abrasive articles of the type described herein. Although extrusion is generally used to form elongated articles such as tubing and the like, extrusion is also applicable to form sheets by using an appropriate shaped die. FIG. 14 shows a sheet of an abrasive article 510 that has been formed by an extrusion device 512. The extrusion device 512 includes a hopper 514 that accepts a powder mixture of an abrasive grit material, a thermoplastic or thermoset material and secondary fillers of the type discussed above. A screw 516 within the device 512 rotates to move the mixture towards a specially shaped die 518 at the end of a nozzle 520. A series of heating bands 524 heat the mixture as it is moved toward the die 518 so that the mixture is sufficiently pliable by the time it reaches the nozzle 520. The action of the screw 516 forces the article 510 out of the die 518 so as to have the desirable shape. The operation of an extrusion device of this type is well understood in the art.

Figures 15, 16:
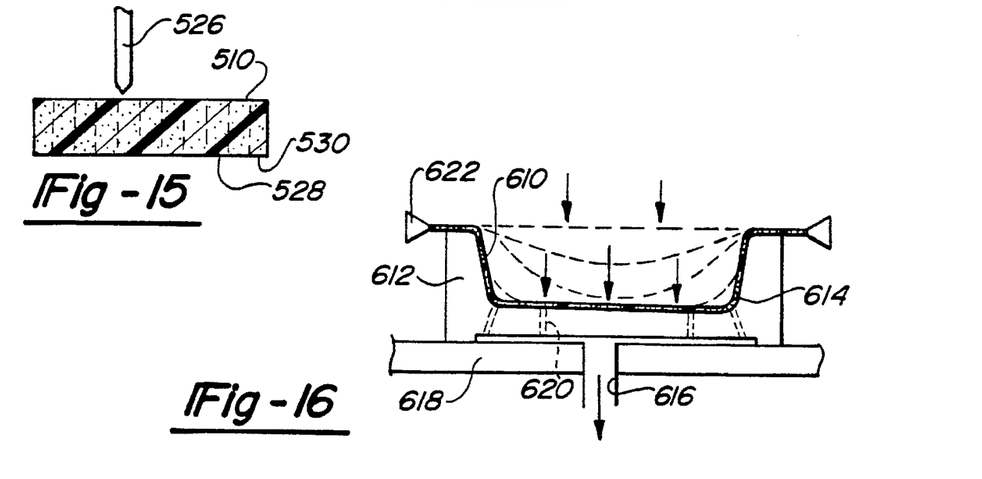
FIG. 15 shows a flexible abrasive sheet formed by the extrusion device of FIG. 14 relative to a cutter to cut the abrasive article into desirable shapes.
FIG. 16 is a side plan view of a thermoforming mold for thermomolding a flexible abrasive article.

The abrasive sheet 510 that is formed from the die 518 is cooled, and then positioned to be cut by a cutter 526 as shown in FIG. 15. As with the abrasive article 410 discussed above, the abrasive article 510 can be sliced or stamped into desirable configurations for a particular use by an appropriate cutter. The cutter 526 cuts the article 510 along lines 528 to form strips 530 of an abrasive material.

As mentioned above, an abrasive article of the type described herein can also be fabricated by a thermoforming process. FIG. 16 shows an abrasive article 610 being formed by a heated thermoforming mold 612 applicable to shape the abrasive article 610 into the shape of a mold cavity 614. An outlet port 616 through a base member 618 is in communication with the cavity 614 through a series of orifices 620. A sheet of the abrasive article 610 is suspended above the mold 612 by any suitable holding device 622. A vacuum applied to the port 616 causes the article 610 to be sucked into the cavity 614 to be formed to the shape of the cavity 614. Once the article 610 has cooled, it can be removed from the mold 612. The abrasive article 610 can then be sent to a cutting station of the type discussed above to be cut into desirable shapes for different applications.

Further understanding of the present invention may be obtained by reference to the following examples which are given as further illustration of the present invention and are not to be construed to be limiting to the present invention.

EXAMPLE I 50 grams of polypropylene powder obtained from Himont Corporation of Troy, Mich., product code number PC 072 PM, having a melt grade of 6 to 9, were mixed with 30 grams of a silicon carbide 600 grit abrasive material and 15 grams of a diamond 20/40 micron material. The powder and abrasive grit material were mixed and blended to form a congruous intermixed material.

A lower mold platen having a 3¼ inch diameter circular indentation with indentations therein for forming ⅛ inch diameter and ¹⁄₁₆ inch high projections and including mold portions for forming a lip ⅛ inch wide by ¹⁄₁₆ of an inch high was provided. A pin was provided at the center of the above mold which is ½ inch in diameter for performing the hole in the resulting abrasive pad.

13 grams of the above mixture was placed around the ½ inch pin into the bottom mold platen. On top of this a 20 mesh fiberglass material, formed 3¼ inches in diameter with a ½ inch center hole was placed. Thereafter, a suitable top platen was lowered on the above components and heated to 380° F. at 5 tons pressure for six minutes.

The abrasive grit and thermoplastic material melts and flows into the mold. The mold was released forming an abrasive pad with a lip portion, co-planar abrasive protrusions having abrasive grit material interspersed therein and a fiberglass reinforcement member embedded therein. The resulting pad was found to be suitable for floor polishing and edge polishing, railings, headstones, monuments and other marbles and the like.

EXAMPLE II

A mold was prepared wherein a 3.5 inch diameter cavity was made with a 45° outer ramp flange 0.156 inches wide and having a 0.875 inch center hole. One face of the mold is planar and flat but includes surfaces for forming an inner and outer backing lip with six pairs of concentrically spaced supporting protrusions on the bottom surface and a pad. The upper working surface includes surfaces for forming a series of 0.05 inch diameter abrasive protrusions which extend 0.05 inches to 0.06 inches in pie shaped areas which are mounted to a 0.015 inch thick web. Six spaced radially extending surfaces for forming slots in a final pad are equiangularly spaced between these pie shaped areas and are 0.180 inches wide. These are angularly spaced radially from the center hole to the outer edge.

A mixture of 50 grams of a polypropylene powder having product code number PC 072 PM, obtained from Himont Corporation of Troy, Mich., which has a melt grade of 6 to 9 was mixed with 30 grams of a silicon carbide 600 grit abrasive material and 15 grams of a diamond 20/40 micron material.

An injection molding apparatus having three heat zones was utilized. A mold with a heated nozzle and a carbide gate and shut off plunger were used in an injection molding apparatus having three heat zones. The above mixture material is injection molded at a temperature of 440° F. using 1,000 psi and 50 pounds of back pressure. The mold base was water cooled and the clamp to clamp cycle time was about approximately 12 seconds. After the molding was completed a pad was removed and was found to be suitable for long life marble or stone polishing.

EXAMPLE III

A mold was prepared wherein a 3.5 inch diameter cavity was made with a 45° outer ramp flange 0.156 inches wide and having a 0.875 inch center hole. One face of the mold is planar and flat but includes surfaces for forming an inner and outer backing lip with six pairs of concentrically spaced supporting protrusions on the bottom surface and a pad. The upper working surface includes surfaces for forming a series of 0.05 inch diameter abrasive protrusions which extend 0.05 inches to 0.06 inches in pie shaped areas which are mounted to a 0.015 inch thick web. Six spaced radially extending surfaces for forming slots in a final pad are equiangularly spaced between these pie shaped areas and are 0.180 inches wide. These are angularly spaced radially from the center hole to the outer edge.

A mixture of 50 grams of a polypropylene powder having product code number PC 072 PM, obtained from Himont Corporation of Troy, Mich., which has a melt grade of 6 to 9 was mixed with 30 grams of a silicon carbide 600 grit abrasive material and 15 grams of a diamond 20/40 micron material.

An injection molding apparatus having three heat zones was utilized. A mold with a heated nozzle and a carbide gate and shut off plunger were used in an injection molding apparatus having three heat zones. The above mixture material is injection molded at a temperature of 440° F. using 1,500 psi and 1,000 pounds of back pressure. The mold base was water cooled and the clamp to clamp cycle time was about approximately 30 seconds. After the molding was completed a pad was removed and was found to be suitable for long life marble or stone polishing.

EXAMPLE IV

Injection molded lens lapping cylinder tools were produced in a conventional injection molding machine as follows.

Introduced into the barrel of the machine was 2200 grams of a mixture of 57% by weight polypropylene resin, 29% by weight 3 micron aluminum oxide powder and 14% by weight grit particles of diamond 600 grit.

The rear heating station of the injection molding machine was maintained at a temperature of 350° F. The middle heating station was maintained at a temperature of 370° F.

The nozzle was maintained at a temperature of 410° F. The lapping tools were molded at a temperature of 1000 psi with 50 pounds of back pressure and a cycle time of 1:20:00 minutes.

The resultant product were lens lapping cylinder tools weighing 250 grams each.

The resulting product was installed on a cylinder lapping machine and found to be suitable for both fine grinding and polishing. The lapping tool produced was used to fine grind a plastic lens in 1.5 minutes and to polish a plastic lens in 4.0 minutes.

EXAMPLE V

An abrasive mixture is prepared as in example IV. The material is placed in the hopper of a blow molding maching. A cylinder is formed in the blow molder. The cylinder is cut into a series of continuous rings. One of the rings is secured to a circular core for forming an abrasive wheel.

EXAMPLE VI

A powder mixture is produced as in Example IV. The powder and abrasive grit material is mixed and blended to form a congruous intermixed material.

The mixture is then introduced into an extrusion device including an appropriately shaped die to produce an abrasive sheet. The extrusion device is heated, and a screw within the extrusion device is rotated to force the mixture against the die. An abrasive sheet is emitted from the die and is cooled. The abrasive sheet is then moved to a cutting station to be cut by an appropriate cutter into abrasive sections.

While the above description constitutes the preferred embodiments of the present invention, it is to be appreciated that the invention is susceptible to modification, variations and change of departing from the proper scope and fair meaning of the accompanying claims.

What is claimed is:

1. An abrasive article comprising:
    a molded abrading body produced from a blow molded polymer material with an abrasive material and a secondary filler material interdispersed homogeneously therethrough, said abrading body comprising from about 1% to about 20% by volume of an abrasive grit, from about 5% to about 80% by volume of secondary fillers and from about 5% to about 90% by volume of a thermoformable polymer, wherein said thermoformable polymer is selected from the group consisting of thermoplastic polymers having a softening point temperature greater than about 100° C. and less than about 400° C. and thermoset polymers.

2. The abrasive article according to claim 1 wherein the thermoformable polymer is a thermoplastic polymer.

3. The abrasive article according to claim 1 wherein the thermoformable polymer is a thermoset polymer.

4. The abrasive article according to claim 2 wherein the thermoplastic polymer is a polypropylene material.

5. The abrasive article according to claim 2 further comprising a substrate wherein the abrading body is blow molded thereon.

6. The abrasive article according to claim 5 wherein the thermoplastic polymer is a polypropylene material.

7. The abrasive article according to claim 1 wherein the abrasive material includes a diamond grit.

8. A method of manufacturing an abrasive article, said method comprising the steps of:
    providing a blow molded cavity for forming a shape of the abrasive article;
    formulating a fluid mixture for blow molding of the abrasive article, said mixture comprising from about 1% to about 20% by volume of an abrasive grit, from about 5% to about 80% by volume of secondary fillers, and from about 5% to about 90% of a blow molding thermoformable polymer, wherein the thermoformable polymer is selected from a group consisting of thermoplastic polymers having a softening point temperature greater than 100° C. and less than about 400° C. and thermoset polymers; and
    blow molding the abrasive article by forcing a gas mixture into the fluid mixture to force the mixture against walls of the cavity.

9. The method according to claim 8 wherein the blow molding thermoformable polymer is a thermoplastic polymer.

10. The method according to claim 9 wherein the thermoplastic polymer is a polypropylene material.

11. The method according to claim 8 wherein the abrasive grit is a diamond grit material.

12. The method according to claim 8 wherein the secondary fillers are selected from a group consisting of silicon carbides, aluminum oxides, including corundums, and mixtures thereof.

13. The method according to claim 8 wherein the thermoformable polymer is a thermoset polymer.

* * * * *